United States Patent [19]
Takeda et al.

[11] Patent Number: 5,327,339
[45] Date of Patent: Jul. 5, 1994

[54] IMAGE FORMING METHOD

[75] Inventors: Kenichi Takeda; Yuji Sakemi, both of Yokohama, Japan

[73] Assignee: Canon Kabushiki Kaisha, Tokyo, Japan

[21] Appl. No.: 3,944

[22] Filed: Jan. 19, 1993

Related U.S. Application Data

[63] Continuation of Ser. No. 321,175, Mar. 9, 1989, abandoned.

[30] Foreign Application Priority Data

Mar. 10, 1988 [JP] Japan ................... 63-054821
Jul. 20, 1988 [JP] Japan ................... 63-182562

[51] Int. Cl.⁵ .................. G01D 15/14; G01D 9/42; G03G 15/09
[52] U.S. Cl. .................. 346/160; 346/108; 355/251
[58] Field of Search .......... 346/153.1, 762, 160, 346/108; 355/251

[56] References Cited

U.S. PATENT DOCUMENTS

| | | | |
|---|---|---|---|
| 4,207,101 | 6/1980 | Vola et al. | 346/160.1 |
| 4,299,900 | 11/1981 | Mitsuhashi et al. | 430/122 |
| 4,525,828 | 6/1985 | Higashiyama et al. | 346/76 L |
| 4,557,992 | 12/1985 | Haneda et al. | 355/251 X |
| 4,800,442 | 1/1989 | Riseman et al. | 358/280 |
| 4,893,179 | 1/1990 | Ito | 346/157 |

FOREIGN PATENT DOCUMENTS

| | | | |
|---|---|---|---|
| 0106465 | 4/1984 | European Pat. Off. | 346/160.1 |
| 0216462 | 4/1987 | European Pat. Off. | 346/160.1 |
| 0227006 | 7/1987 | European Pat. Off. | 346/160.1 |
| 3008881 | 9/1980 | Fed. Rep. of Germany | 346/160.1 |
| 3546358 | 7/1986 | Fed. Rep. of Germany | 346/160.1 |

Primary Examiner—George H. Miller, Jr.
Attorney, Agent, or Firm—Fitzpatrick, Cella, Harper & Scinto

[57] ABSTRACT

There is provided an image forming method, including: gradation-processing an image signal based on a halftone image to output a pulse-width-modulated signal; forming a latent image on a latent image-bearing member on the basis of the pulse-width-modulated signal; and developing the latent image with a developer comprising a toner to reproduce the halftone image; wherein the toner has a volume average particle size of M and comprises toner particles having a particle size of r; and has a volume-basis distribution such that it comprises 90% by volume or more of toner particles satisfying $M2 < r < 3/2M$ and comprises 99% by volume or more of toner particles satisfying $0 < r < 2M$.

22 Claims, 8 Drawing Sheets

IMAGE FORMING METHOD

This application is a continuation of application Ser. No. 07/321,175, filed Mar. 9, 1989, now abandoned.

FIELD OF THE INVENTION AND RELATED ART

The present invention relates to an image forming method, particularly to an image forming method capable of providing a stable image density in a highlight portion as output from a digital full-color printer using a laser beam.

A laser beam printer utilizing an electrophotographic system is known as a printer capable of effecting a high speed recording with little noise, and is typically used for two-valued (or binary) recording of images such as letters and figures. Because such recording of letters and figures does not require half-tone recording, the printer used therefor may have a simple structure.

On the other hand, there is a printer capable of effecting half-tone recording while using the two-valued recording system. As such a printer, those using a method such as the dither method or the density pattern method are well known. However, it is difficult to obtain high resolution with these printers using the dither method or density pattern method.

Recently, there has been developed a printer which is capable of effecting half-tone recording by subjecting a laser beam to pulse-width-modulation (PWM) by use of an image signal, while using a two-valued recording system (U.S. Pat. No. 4,800,442). The PWM system may provide an image having a high resolution and an excellent gradational characteristic which are required for color-image formation.

However, such a PWM system can sometimes cause a new problem. For example, in a case where the pulse width (or pulse duration) of the PWM signal is very short and a laser beam is barely emitted thereby, the difference between the latent image (or light part) potential and the dark part potential formed on a photosensitive drum due to the provision of such a laser beam becomes smaller than that obtained in a case where the laser beam is sufficiently provided to the drum. As a result, there occurs a problem that the resultant latent image is less liable to be developed with a developer.

SUMMARY OF THE INVENTION

An object of the present invention is to provide an image forming method which has solved the above-mentioned problem.

Another object of the present invention is to provide an image forming method capable of providing an image having an excellent gradational characteristic in its low-density image portion.

A further object of the present invention is to provide a color-image forming method comprising gradation-processing an image signal based on providing little toner scattering even when toners of respective colors are multiply transferred to a transfer material such as transfer paper.

A further object of the present invention is to provide a color-image forming method capable of providing a full-color or multi-color image of high definition.

According to the present invention, there is provided an image forming method, comprising:

gradation-processing an image signal based on a halftone image to output a pulse-width-modulated signal, forming a latent image on a latent image-bearing member on the basis of the pulse-width-modulated signal; and developing the latent image with a developer comprising a toner to reproduce the halftone image;

wherein the toner has a volume average particle size of M and comprises toner particles having a particle size of r; and has a volume-basis distribution such that it comprises 90% by volume or more of toner particles satisfying $M/2 < r < 3/2M$ and comprises 99% by volume or more of toner particles satisfying $0 < r < 2M$.

The present invention also provides an image forming method, comprising:

gradation-processing an image signal based on a halftone image to output a pulse-width-modulated signal, forming a latent image on a latent image-bearing on the basis of the pulse-width-modulated signal; and developing the latent image with a developer comprising a toner to reproduce the halftone image;

wherein the toner has a volume average particle size of 9 micron or below.

The present invention further provides an image forming method, comprising:

gradation-processing an image signal based on a halftone image to output a pulse-width-modulated signal, forming a latent image on a latent image-bearing member on the basis of the pulse-width-modulated signal; and developing the latent image with a developer to reproduce the halftone image;

transferring the halftone image to a transfer material; and fixing the transferred halftone image to the transfer material;

wherein the fixed halftone image comprises reproduced dots of about 50 microns or smaller.

These and other objects, features and advantages of the present invention will become more apparent upon a consideration of the following description of the preferred embodiments of the present invention taken in conjunction with the accompanying drawings.

DETAILED DESCRIPTION OF THE PREFERRED EMBODIMENTS

Hereinbelow, the image forming method according to preferred embodiments of the present invention will be described with reference to the accompanying drawings.

Figure 1:
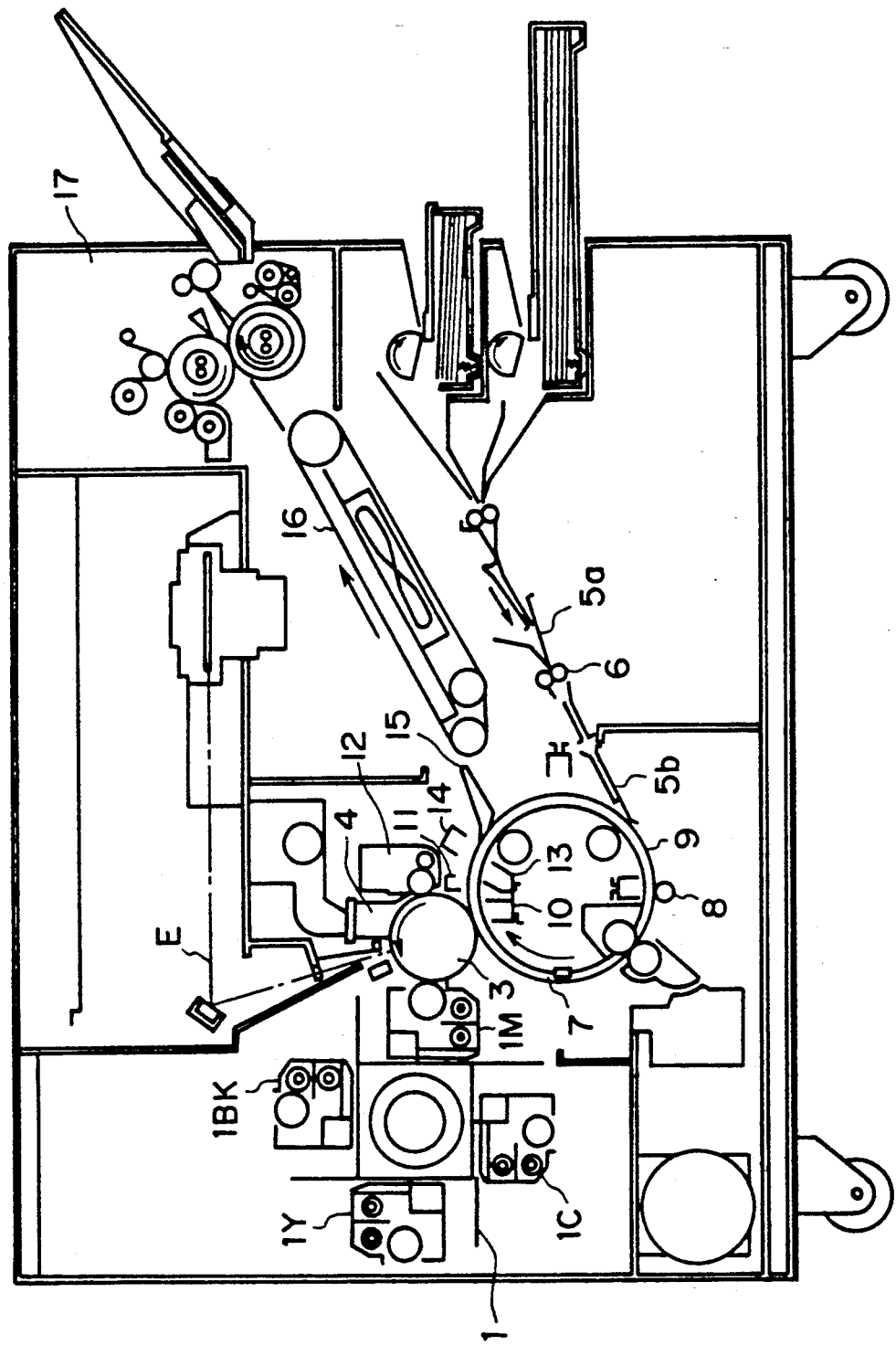
FIGS. 1 and 5 are a schematic sectional views each showing an embodiment of the color-image forming apparatus for practicing the image forming method according to the present invention.

FIG. 1 shows an electrophotographic printer mechanism portion used in the apparatus for practicing the present invention.

Referring to FIG. 1, the printer mechanism comprises a photosensitive drum 3 as a latent image-bearing member rotating in the direction of an arrow shown in the figure; and a charger 4, a developing device 1M (or 1C, 1Y or 1BK), a transfer charger 10 and a cleaning device 12 disposed in this order along the peripheral surface of the photosensitive drum 3 with respect to the rotating direction thereof; and a laser beam scanner for providing a laser beam E disposed above (in the figure) the photosensitive drum 3, and other optional components.

The laser beam scanner comprises a semiconductor laser portion, a polygon mirror rotating at a high speed, an f-θ lens, a light-shielding plate (not shown), and other optional components. The semiconductor laser portion receives an input comprising a time series of digital pixel signals which has been operation-output from an image reader or computer and the like (not shown), and produces a pulse-width-modulated laser beam corresponding to the signals. The thus produced laser beam E is supplied to the surface of the drum 3 passing through a position between the charger 4 and the developing device 1M (or 1C, 1Y or 1BK), while scanning the drum surface in the direction of drum generatrix (i.e., the drum axis).

Figure 7:
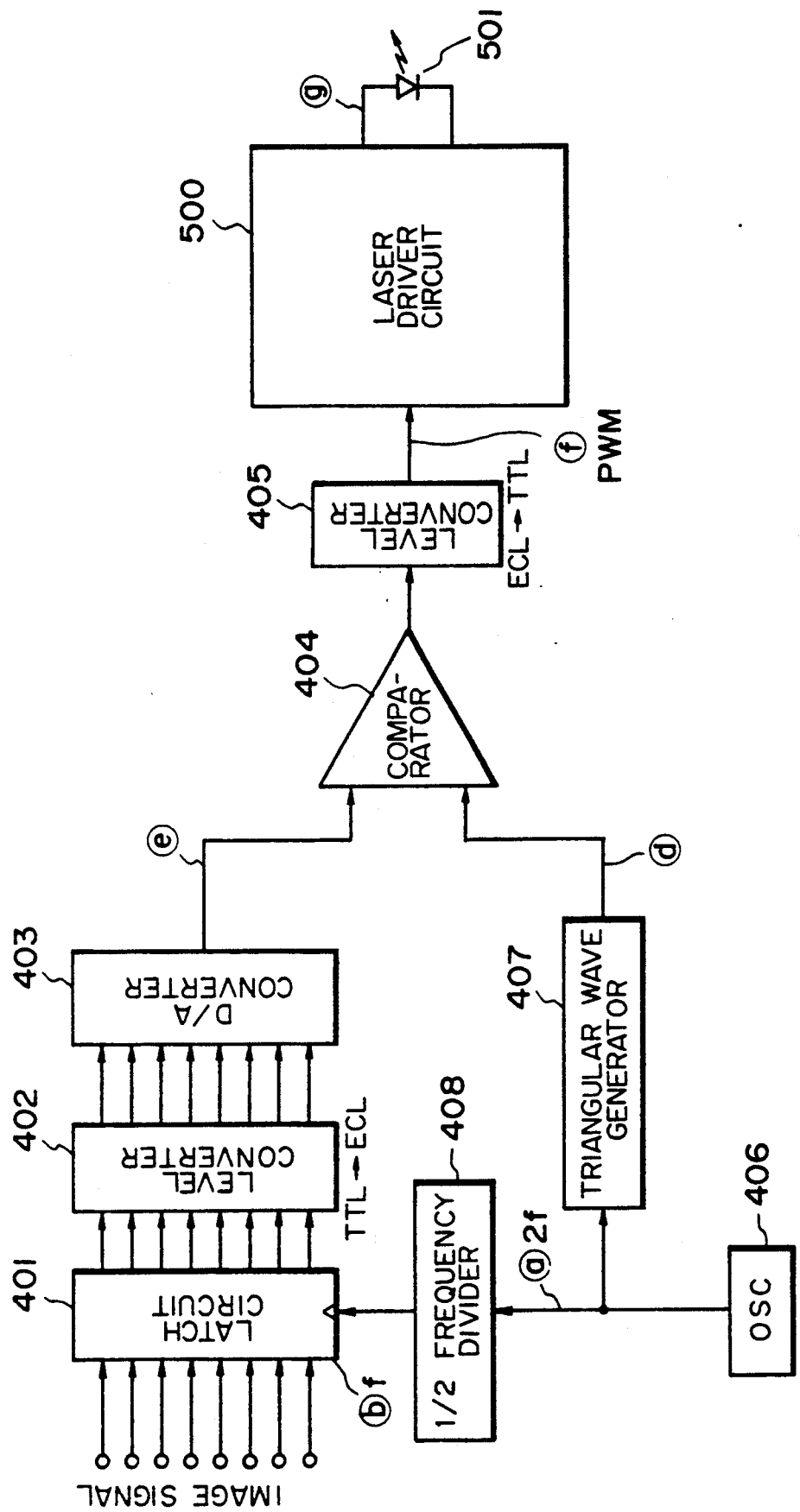
FIG. 7 is a circuit diagram showing a PWM (pulse-width-modulation) circuit used in an Example appearing hereinafter.
Figure 8:
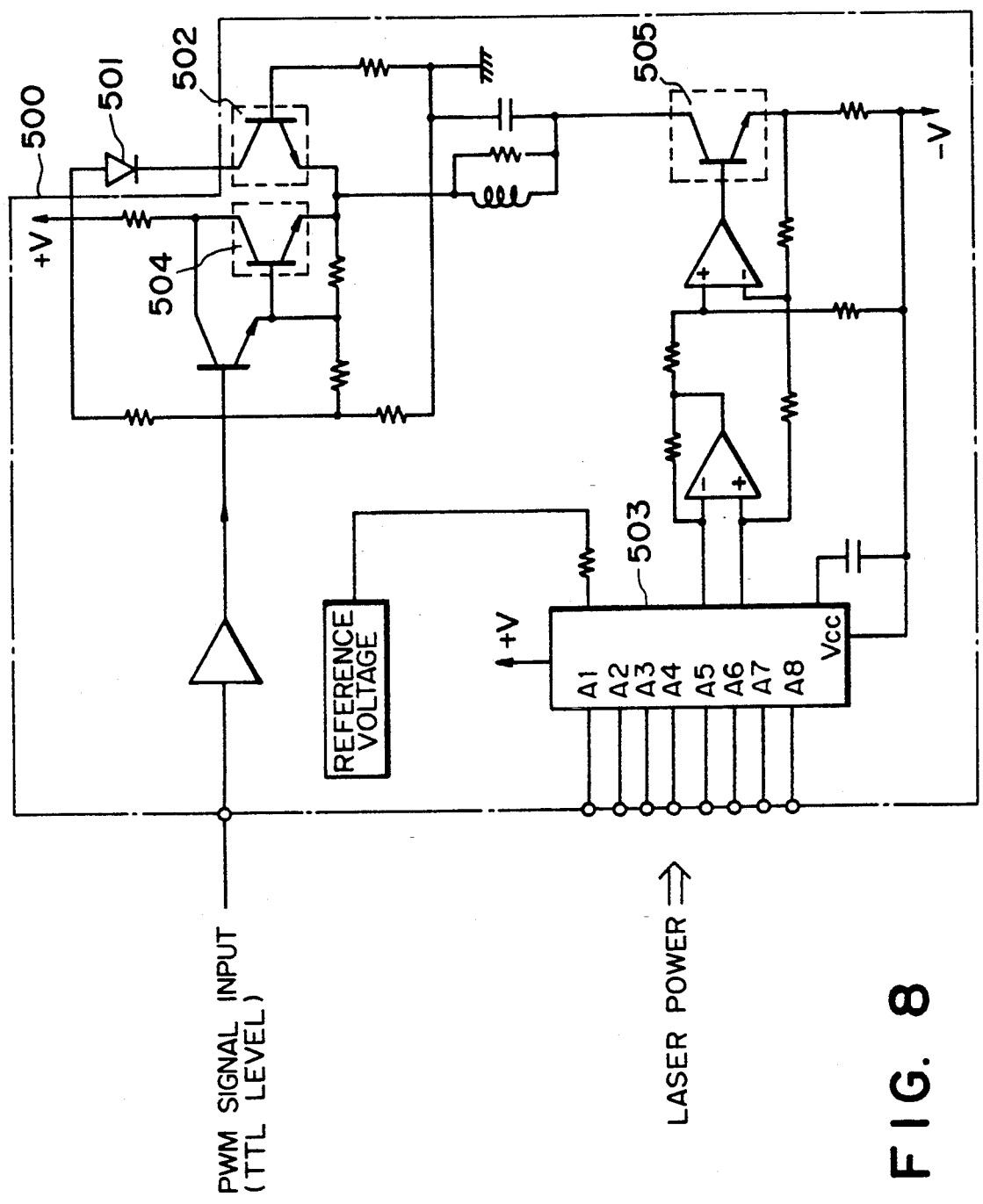
FIG. 8 is a circuit diagram showing a laser driver circuit used in Example appearing hereinafter.
Figure 9:
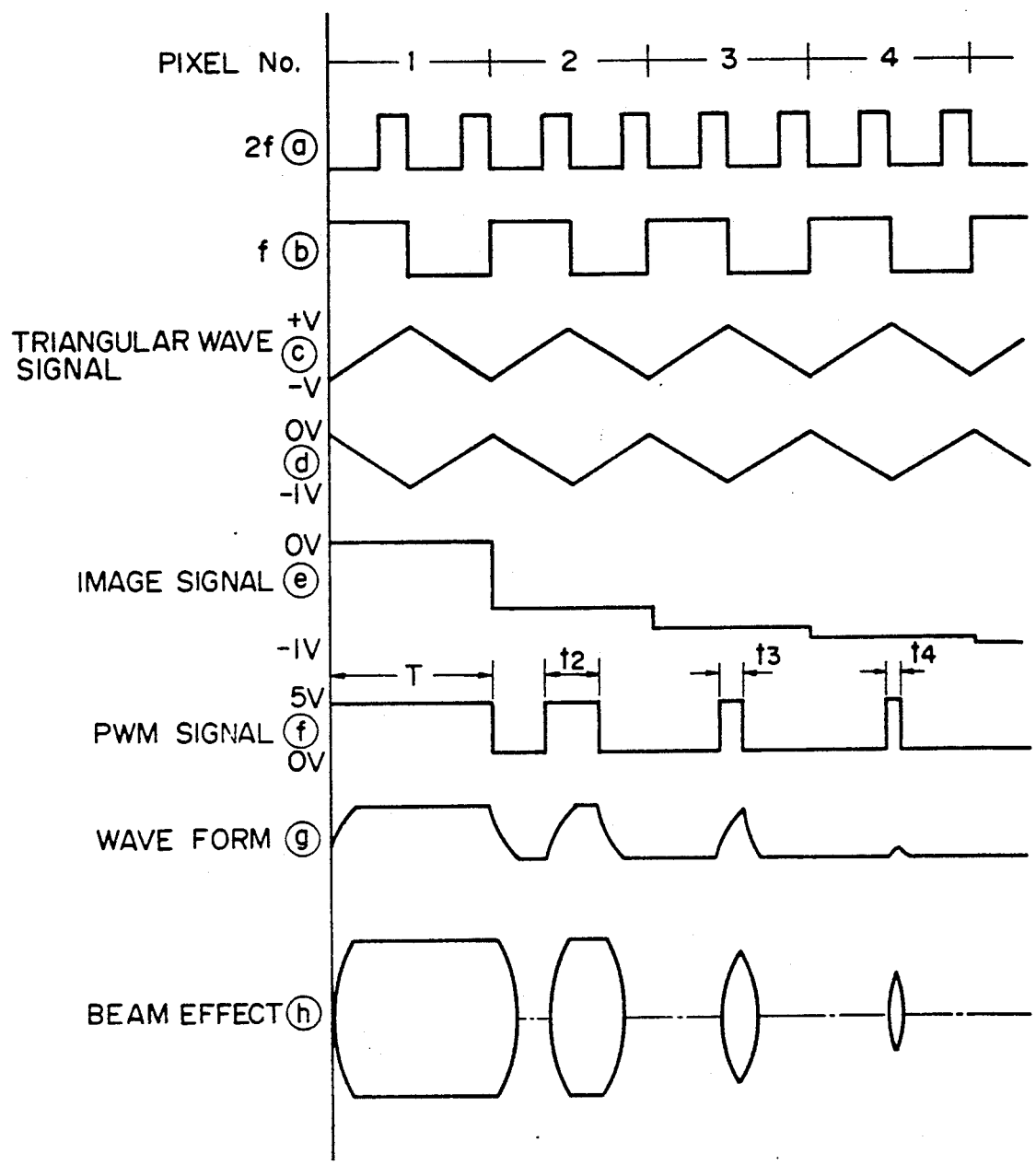
FIG. 9 is a timing chart showing an operation of the PWM circuit.

FIG. 7 shows a circuit diagram of a PWM circuit used in the apparatus in this embodiment, and FIG. 8 shows a circuit diagram of a laser driver circuit used in such apparatus. FIG. 9 is a timing chart showing an operation of the PWM circuit.

In FIG. 7, reference numeral 401 denotes a transistor-transistor logic (TTL) latch circuit for latching an 8-bit image signal, 402 denotes a level converter for converting TTL logic level to high-speed emitter-coupled logic (ECL) logic level, 403 denotes ECL digital/analog (D/A) converter, 404 denotes an ECL comparator for generating a PWM signal, 405 denotes a level converter for converting ECL logic level to TTL logic level, 406 denotes a clock oscillator for producing a clock signal $2f$ having twice the frequency of a pixel clock signal f, 407 denotes a triangular wave signal generator for generating substantially an ideal triangular wave signal in synchronism with the clock signal $2f$, and 408 denotes a ½-frequency demultiplier for dividing the frequency of the clock signal $2f$ into ½ thereof. In order to operate the circuit at a high-speed, several ECL logic circuits are disposed therein.

The operation of the above-mentioned circuit is described with reference to FIG. 9.

Referring to FIG. 9, a signal (a) denotes a clock signal $2f$, a signal (b) denotes a pixel clock signal f having a period which is 2 times larger than that of the clock signal $2f$, and these signals are shown in connection with a pixel number. In the triangular wave signal generator 407, in order to retain the duty ratio of the triangular wave signal at 50%, the frequency of the clock signal $2f$ is first divided into ½ and a triangular wave signal (c) is caused to be generated. Further, the triangular wave signal (c) is converted into ECL level (0 to $-1$ V) to generate a triangular wave signal (d).

On the other hand, the image signal is changed by 256 gradation levels ranging from 00H ("white") to FFH ("black"). "H" used herein is a hexadecimal indication.

Further, an image signal (e) denotes ECL voltage levels obtained by D/A-converting some image signal values. For example, the first pixel (pixel No. 1) denotes a voltage corresponding to "FFH" at a black pixel level, the second pixel (pixel No. 2) denotes a voltage corresponding to "80H" at a half-tone level, the third pixel (pixel No. 4) denotes a voltage corresponding to "40H" at a half-tone level, and the fourth pixel (pixel No. 4) denotes a voltage corresponding to "20H" at a half-tone level.

The comparator 404 compares the triangular wave signal (d) with the image signal (e) and generates a PWM signals having a pulse width such as T, $t_2$, $t_3$ and $t_4$ corresponding to a pixel density to be provided. Then, the PWM signal is converted into TTL level of 0 V or 5 V to produce a PWM signal (f), which is then input to a laser driver circuit 500.

Referring to FIG. 8, reference numeral 500 denotes a constant-current type laser driver circuit, and 501 denotes a semiconductor laser element. The semiconductor laser element emits a laser beam when a switching transistor 502 is turned on, and does not emit a laser beam when the switching transistor 502 is turned off. The switching transistor 502 constitutes a current switch circuit in combination with a transistor 504 to be paired therewith, and subjects a definite current to be supplied to the semiconductor laser element 501 to ON/OFF (commutation) control. The definite current is supplied from a constant-current supply transistor 505, and the value thereof is variable. The value of the definite current is determined by converting the eight-bit laser power value input to the driver circuit to an analog voltage by use of a D/A converter 503, and comparing it with a reference voltage.

However, the response characteristic of the laser beam can pose a problem as follows.

Thus, referring to FIG. 9, when the maximum emission time per one pixel is represented by T (sec), it is ideal that when the pulse width of a PWM signal is changed from 0 to T (sec), the laser beam from the semiconductor laser element 501 is emitted in a period corresponding to the above-mentioned pulse width. However, in practice, because the signal is passed through the semiconductor laser element 501 and the driver circuit 500 therefor, there occurs a response lag (or delay) between the PWM signal (f) and the turning-ON/turning-OFF of the laser beam, as shown by a waveform (g) in FIG. 9.

For example, somewhat good results can be obtained in the case of a pulse width of T or $t_2$. However, in the case of a pulse width of $t_3$, the laser beam is not completely turned on, and in the case of the pulse width of $t_4$, the semiconductor laser element does not practically operate.

A beam effect (h) in FIG. 9 denotes an emission state of the laser beam two-dimensionally. Because the first pixel denotes "black", the laser beam is turned on during the whole period. However, for example, when the pulse width of the PWM signal becomes a very short period of $t_3 = 10$ ns, the resultant laser beam assumes a very unstable state such that it is barely emitted. Generally speaking, when a latent image is formed on a latent image bearing member by using such an unstable laser beam and the resultant latent image is developed by an electrophotographic process to form a toner image, it is difficult to obtain a stable image density.

As described above, when a gradational recording is conducted by using the PWM method, the minimum pulse width capable of providing a stable image density is limited. For example, when such a limit is $t_3 = 10$ ns, it is difficult to reproduce a gradational image (i.e., a highlight portion) corresponding to a pulse width which is shorter than the above-mentioned value. As a result, in the prior art, it has been difficult to obtain a high-quality image wherein a highlight portion is faithfully reproduced.

As a result of a large number of experiments, Applicants have found that the above-mentioned problem can be solved by suitably regulating the particle size distribution and/or the volume-average particle size of a toner constituting a developer, and have reached the present invention.

More specifically, in the image forming method according to the present invention, there is used a toner which comprises 90% by volume or more of toner particles having a particle size r in a range satisfying $\frac{1}{2}M < r < 3/2M$ (i.e., in the range of $M \pm M/2$, M: volume-average particle size of the toner), and comprises 99% by volume or more of toner particles satisfying $0 < r < 2M$ (i.e., in the range of $M \pm M$).

In the present invention, there may preferably be used a toner having a volume-average particle size of below 12 microns (more preferably 10 microns or below, particularly preferably 8 microns or below).

In the present invention, the volume-basis distribution and the volume-average particle size of a toner may for example be measured in the following manner.

Coulter counter Model TA-II (available from Coulter Electronics Inc.) is used as an instrument for measurement, to which an interface (available from Nikkaki K.K.) for providing a number-basis distribution, a volume-basis distribution, a number-average particle size and a volume-average particle size, and a personal computer CX-1 (available from Canon K.K.) are connected.

For measurement, a 1%-NaCl aqueous solution as an electrolytic solution is prepared by using a reagent grade sodium chloride. Into 100 to 150 ml of the electrolytic solution, 0.1 to 5 ml of a surfactant, preferably an alkylbenzenesulfonic acid salt, is added as a dispersant, and 0.5 to 50 mg, of a sample is added thereto. The resultant dispersion of the sample in the electrolytic liquid is subjected to a dispersion treatment for about 1-3 minutes by means of an ultrasonic disperser, and then subjected to measurement of particle size distribution in the range of 2-40 microns by using the above-mentioned Coulter counter Model TA-II with a 100 microns-aperture to obtain a volume-basis distribution. From the results of the volume-basis distribution, the volume-average particle size of the sample toner are calculated.

When the toner has a distribution exceeding the above-mentioned range, sufficient effect cannot be obtained even when the particle size of the toner is changed. More specifically, when toner particles having a larger particle size are increased, even when the average particle size of the toner is made as small as possible, such particles having a larger particle size and causing scattering in a transfer step are present, whereby it is difficult to reduce coarsening in a low-image density portion.

On the other hand, when toner particles having a small particle size are increased, the amount of the toner component which adheres to magnetic particles (carrier) and is difficult to be released therefrom, is also increased, and the magnetic particles cannot effectively impart triboelectric charge to the toner, whereby toner scattering from a developing device and fog become marked. Further, because toner particles having a small particle size are liable to stick to the magnetic particles to increase fog and scattering due to carrier deterioration.

Figure 3:
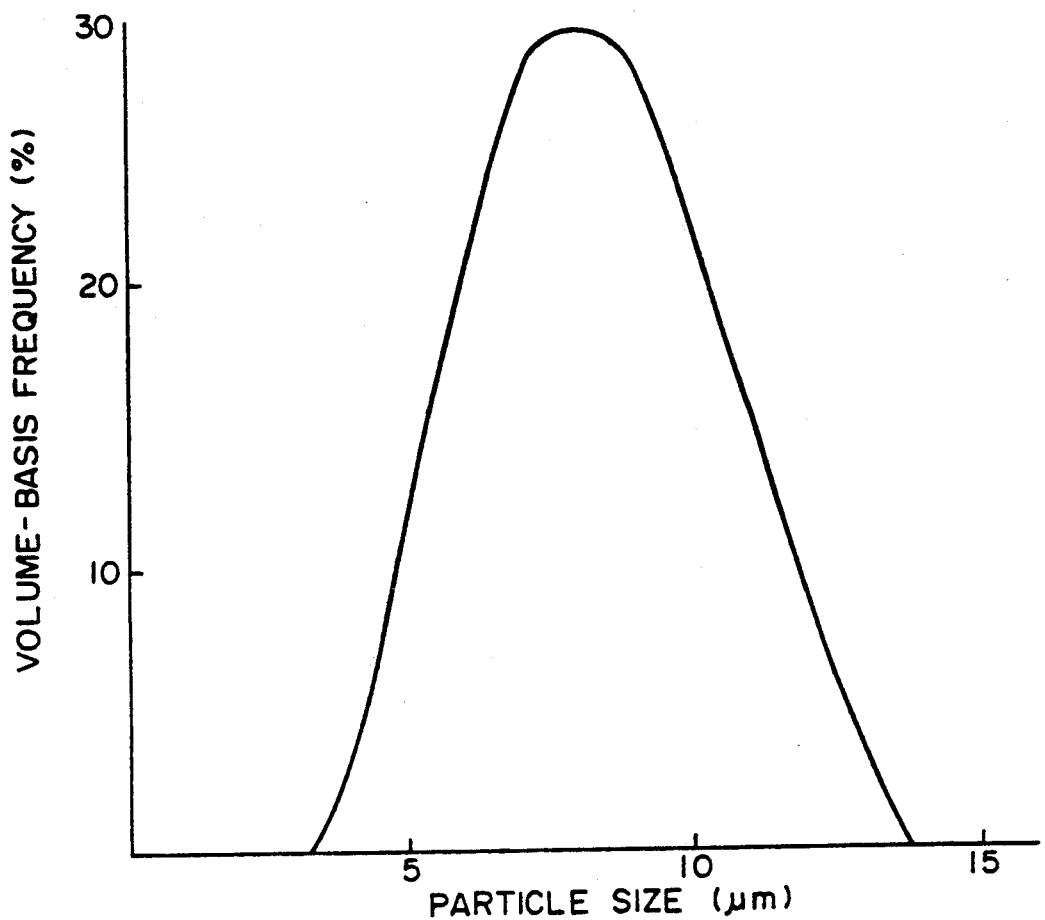
FIG. 3 is a graph showing a particle size distribution of a toner used in the present invention.

As described above, in the present invention, it is necessary to use a toner showing a sharp particle size distribution (e.g., one as shown in FIG. 3).

Figure 4:
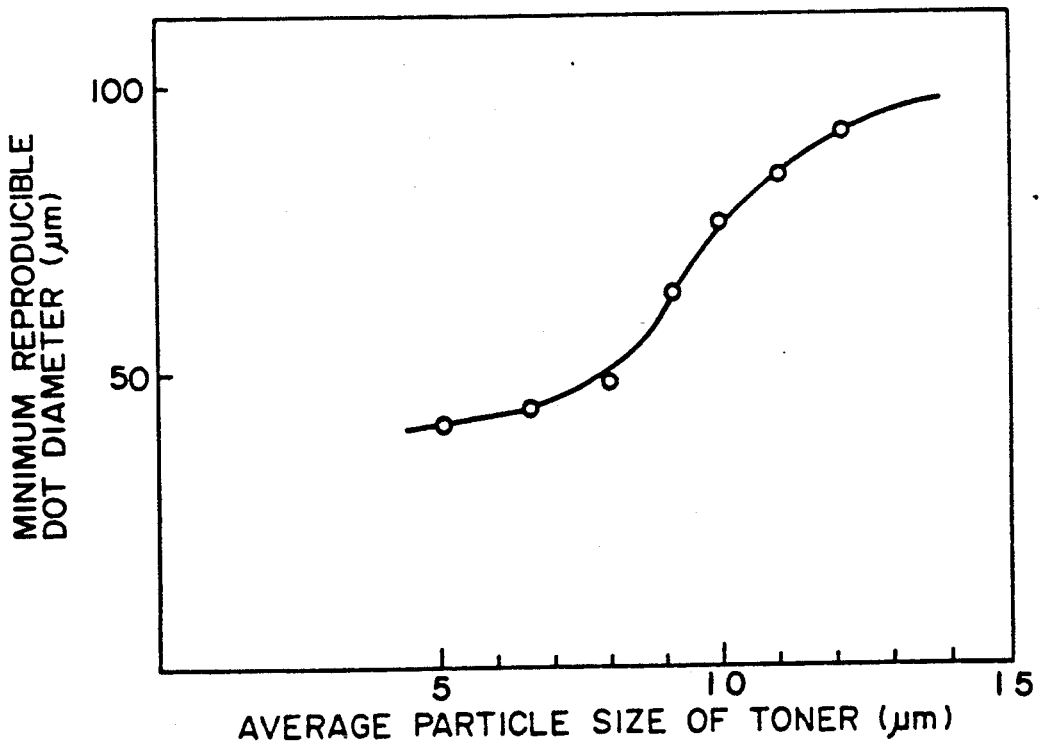
FIG. 4 is a graph showing a relationship between the average particle size of a toner and a minimum reproducible dot diameter.

FIG. 4 is a graph showing the relationship between an average particle size of a toner and a minimum reproducible dot diameter. The relationship as shown in FIG. 4 has been obtained by the following experiment.

By use of an image forming apparatus using a laser beam providing a spot in the form of an ellipse (longer axis: 80 microns, shorter axis 70 microns), a latent image was formed on a photosensitive drum in the same manner as in the Examples appearing hereinafter, and developed with a toner to form a toner image, which was then transferred to a transfer material and fixed thereto by a hot roller fixing device. Such an experiment was repeated while changing the average particle size of the toner to obtain the relationship as shown in FIG. 4.

In the above-mentioned experiment, the minimum reproducible dot diameter was not substantially affected even when a superposition of an AC bias and a DC bias, or a DC bias alone was used, or the kind of the carrier, the gap or clearance between a sleeve (developer-carrying member) and the drum or between the sleeve and a blade (developer thickness regulation means) are changed with respect to the respective toner particle size.

The reason for such a phenomenon may be considered as follows.

In the method wherein a latent image is formed (or written) on a photosensitive drum by regulating the emission time of a laser beam, in the result, the intensity of light is modulated as shown by the beam C effect (h) in FIG. 9. Therefore, when the spot diameter of the laser beam is decreased, the peak potential at the center of the spot is also decreased. Further, when the spot diameter is small, an apparent potential is lowered even when the charge at the surface is constant. On the other hand, as the particle size of a toner becomes smaller, the effect of surface area becomes greater than that of the volume or weight, whereby the effect of the charge becomes greater in the case of the same material. Accordingly, with respect to a portion provided with charge, even when the apparent potential therein is low, toner particles having a small particle size are more liable to attach to such a portion. Further, toner particles having a small particle size form a thin layer on a transfer paper after the transfer thereof, and their adhesion force to the paper becomes stronger. As a result, even when the resultant toner image is subjected to an electric field for transfer plural times, toner scattering is less liable to occur.

Particularly, in a full-color image, the reproducibility in a low-density portion remarkably change the impression of the whole image. When a high-quality full-color image having a gradational characteristic is desired, the impression thereof is remarkably changed depending on whether dots of about 50 microns are faithfully reproduced or not. Accordingly, in the present invention, there may preferably be used a toner having a volume-average particle size of 10 microns or below (more preferably 8 microns or below), because it may faithfully reproduce dots of about 50 microns as described in the above experiment, remarkably reduces toner scattering in a transfer step, thereby to provide a full-color image with high definition having sufficient gradational characteristics in its low-image density portion and having less coarsening or blurring, which has not been obtained in the prior art.

As described above, when a toner having a volume-average particle size of 8 microns or below is used, dots of about 50 microns are faithfully reproduced and the resultant toner image is less disturbed even when it is subjected to an electric field for transfer a plurality of times. Particularly, such a tendency produces a good effect on coarsening and reproducibility in a low-density image portion.

In the present invention, e.g., when the toner used has a volume-average particle size of 6 microns, it is important for the toner to have a volume-basis distribution such that it comprises 90% by volume or more of particles in the range of more than 3 microns and less than 9 microns, and comprises 99% by volume or more of particles in the range of more than zero and less than 12 microns.

The toner used in the present invention having a sharp particle size distribution may be produced by melt-kneading prescribed materials for toner, cooling and pulverizing the kneaded product, and subjecting the pulverized product to precise classification to form a toner having a prescribed particle size distribution and/or volume-average particle size. In order to effect the precise classification, the pulverized powder product may preferably be classified by a fixed-wall type wind-force classifier to obtain a classified powder product, and ultra-fine powder and coarse powder are simultaneously and precisely removed from the classified powder by means of a multi-division classifier utilizing a Coanda effect (e.g., Elbow Jet Classifier available from Nittetsu Kogyo K.K.), thereby to obtain a toner having a prescribed particle size distribution and/or volume-average particle size.

In the present invention, the term "toner" may include colored resin particles (comprising a binder resin and a colorant and another optional additive) per se, and colored resin particles to which an external additive such as hydrophobic colloidal silica has been externally added.

The binder resin used for the toner may for example include: styrene-type copolymers such as styrene-acrylic acid ester resins and styrene-methacrylic acid ester resins; and polyester resins.

In view of color mixing characteristics at the time of fixing, particularly preferred resins may be polyester resins obtained through polycondensation of at least a diol component selected from bisphenol derivatives represented by the formula:

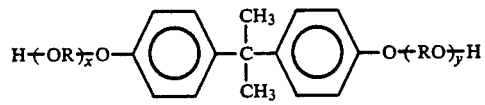

wherein R denotes an ethylene or propylene group; x and y are respectively a positive integer of 1 or more providing the sum (x+y) of 2 to 10 on an average, and their substitution derivatives, and a two- or more-functioned carboxylic acid component or its anhydride or its lower alkyl ester, such as fumaric acid, maleic acid, maleic anhydride, phthalic acid, terephthalic acid and the like. Such polyester resins may show a sharp melting characteristic.

As the colorant, there may be used a dye or pigment which is generally used for an electrophotographic toner.

Examples of the colorants suitable for the purpose of the present invention may include the following pigments or dyes.

Examples of the dyes may include: C.I. Direct Red 1, C.I. Direct Red 4, C.I. Acid Red 1, C.I. Basic Red 1, C.I. Mordant Red 30, C.I. Direct Blue 1, C.I. Direct Blue 2, C.I. Acid Blue 9, C.I. Acid Blue 15, C.I. Basic Blue 3, C.I. Basic Blue 5, and C.I. Mordant Blue 7.

Examples of the pigments may include: Naphthol Yellow S, Hansa Yellow G, Permanent Yellow NCG, Permanent Orange GRT, Pyrazolone Orange, Benzidine Orange G, Permanent Red 4R, Watching Red calcium salt, Brilliant Carmine 3B, Fast Violet B, Methyl Violet Lake, Phthalocyanine Blue, Fast Sky Blue, and Indanthrene Blue BC.

Particularly preferred pigments may include disazo yellow pigments, insoluble azo pigments and copper phthalocyanine pigments, and particularly preferred dyes may include basic dyes and oil soluble dyes.

Particularly preferred examples may include: C.I. Pigment Yellow 17, C.I. Pigment Yellow 15, C.I. Pigment Yellow 13, C.I. Pigment Yellow 14, C.I. Pigment Yellow 12, C.I. Pigment Red 5, C.I. Pigment Red 3, C.I. Pigment Red 2, C.I. Pigment Red 6, C.I. Pigment Red 7, C.I. Pigment Blue 15, C.I. Pigment Blue 16, copper phthalocyanine pigments having two or three carboxybenzamidomethyl groups, and copper phthalocyanine pigments.

Particularly preferred examples of dyes may include: C.I. Solvent Red 49, C.I. Solvent Red 52, C.I. Solvent Red 109, C.I. Basic Red 12, C.I. Basic Red 1 and C.I. Basic Red 3B.

As for the content of the colorant, a yellow colorant for providing a yellow toner, which sensitively affects the transparency of an overhead projection (OHP) film, may preferably be used in a proportion of 0.1 to 12 wt parts, more preferably 0.5-7 wt. parts, per 100 wt. parts of the binder resin. A proportion of more than 12 wt. parts provides a poor reproducibility of mixed colored of yellow, such as green, red and skin color.

A magenta colorant and a cyan colorant for providing the magenta and cyan toners, respectively, may preferably be used in a proportion of 0.1 to 15 wt. parts, more preferably 0.1-9 wt. parts, per 100 wt. parts of the binder resin.

In case of a black toner containing two or more colorants in combination, the addition of more than 20 wt. parts in total is liable to cause spending thereof to the carrier and cause the colorants to be exposed on the toner surface, thus inviting increased sticking of the toner onto the photosensitive drum to destabilize its fixability. For this reason, the amount of the colorants in the black toner should preferably be 3 to 15 wt. parts per 100 wt. parts of the binder resin.

A preferred combination of colorants for providing a black toner may be that of a disazo type yellow pigment, a monoazo-type red pigment and a copper phthalocyanine-type blue pigment. The proportional ratios of the yellow pigment, the red pigment and the blue pigment may preferably be 1:1.5 to 2.5:0.5 to 1.5. As for the preferable examples, the disazo-type yellow pigment may be C.I. Pigment Yellow 17 or C.I. Pigment Yellow 13, the monoazo-type red pigment may be C.I. Pigment Red 5 or C.I. Pigment Red 7, and the copper phthalocyanine-type blue pigment may be C.I. Pigment Blue 15.

It is also preferred to add a charge control agent in order to stabilize the negative chargeability to the toner according to the present invention. In this instance, it is preferred to use a colorless or thin-colored negative charge control agent so as not to affect the color toner of the toner. The magnetic charge control agent may for example be an organo-metal complex such as a metal complex of alkyl-substituted salicylic acid (e.g., chromium complex or zinc complex of di-tertiary-butylsalicylic acid). The negative charge control agent may be added to a toner in a proportion of 0.1 to 10 wt. parts, preferably 0.5 to 8 wt. parts, per 100 wt. parts of the binder resin.

When the developer used in the present invention is a two-component developer comprising a carrier and a toner, the carrier may preferably comprise magnetic particles. The magnetic particles may preferably be those comprising ferrite particles (maximum magnetization: 60 emu/g) which have been coated with a resin so that they have a particle size of 30-100 microns, more preferably 40-80 microns, an electric resistivity of $10^7$ ohm.cm or more, more preferably $10^8$ ohm.cm or more.

The resistivity of the magnetic particles is measured with a sandwiching-type cell having a measuring electrode area of 4 cm$^2$ and having a clearance of 0.4 cm between the electrodes. One of the electrodes is imparted with 1 kg weight, and a voltage E (V/cm) is applied across the electrodes, and the resistivity of the magnetic particles is determined from the current through the circuit.

Hereinbelow, the present invention is specifically described with reference to accompanying drawings each showing an apparatus embodiment used therefor.

FIG. 1 schematically shows the whole arrangement of an electrophotographic color printer as an example of the image forming apparatus in which a developing device according to the present invention is assembled. Referring to FIG. 1, a rotation-type developing device I comprises a yellow developing device 1Y, a magenta developing device 1M, a cyan developing device 1C and a black developing device 1BK.

The sequence for the whole color printer is briefly described with respect to a full-color mode.

Referring to FIG. 1, reference numeral 3 denotes a photosensitive drum rotating in the direction of an arrow shown in the figure, and the photosensitive material disposed on the drum 3 is uniformly charged by means of a charger 4. The drum 3 is then imagewise exposed to a laser light E modulated according to a "magenta" image signal from an original (not shown), to form thereon an electrostatic latent image, which is then developed by means of the magenta developing device which has been disposed at a developing position where the drum 3 is disposed opposite thereto, in advance, thereby to form a magenta image.

On the other hand, a transfer paper (or transfer-receiving paper) is fed to a gripper 7 through the medium of a paper supply guide 5a, a paper supply roller 6 and a paper supply guide 5b. The transfer paper is held by the gripper 7 in synchronism with a prescribed timing, and is electrostatically wound around a transfer drum 9 by means of a contact roller 8 and an electrode disposed opposite thereto. The transfer drum 9 is rotated in the direction of an arrow shown in the figure in synchronism with the rotation of the photosensitive drum 3.

At a transfer position where the transfer drum 9 is disposed opposite to the drum 3, the magenta image developed by the magenta developing device 1M in the above-mentioned manner is transferred from the photosensitive drum 3 to the transfer paper disposed on the transfer drum 9, by means of a transfer charger 10. The transfer drum 9 continues its rotation as such and provides for transfer of the next color (e.g., a cyan color in the embodiment shown in FIG. 1).

On the other hand, the photosensitive drum 3 is discharged by means of a charger 11, and cleaned by a cleaning member 12. Thereafter, the drum 3 is again charged by means of the charger 4, and exposed to light modulated according to a "cyan" image signal in the same manner as described above. During such operation, the developing device I is rotated to dispose the cyan developing device 1C at the developing position, whereby a prescribed "cyan" development is conducted. Then, the above-mentioned procedure is repeated with respect to yellow and black colors.

When the respective transfer operations for the four colors are completed, the transfer paper having thereon the developed image comprising the four colors is discharged by means of chargers 13 and 14 is released from the above-mentioned gripper 7 and separated from the transfer drum 9 by means of a separation claw 15. Then, the thus separated transfer paper is conveyed to a fixing device (hot roller fixing device) 17 by a conveyer belt 16, whereby a series of full-color print sequence is completed and a desired full-color print image is formed.

Figure 2:
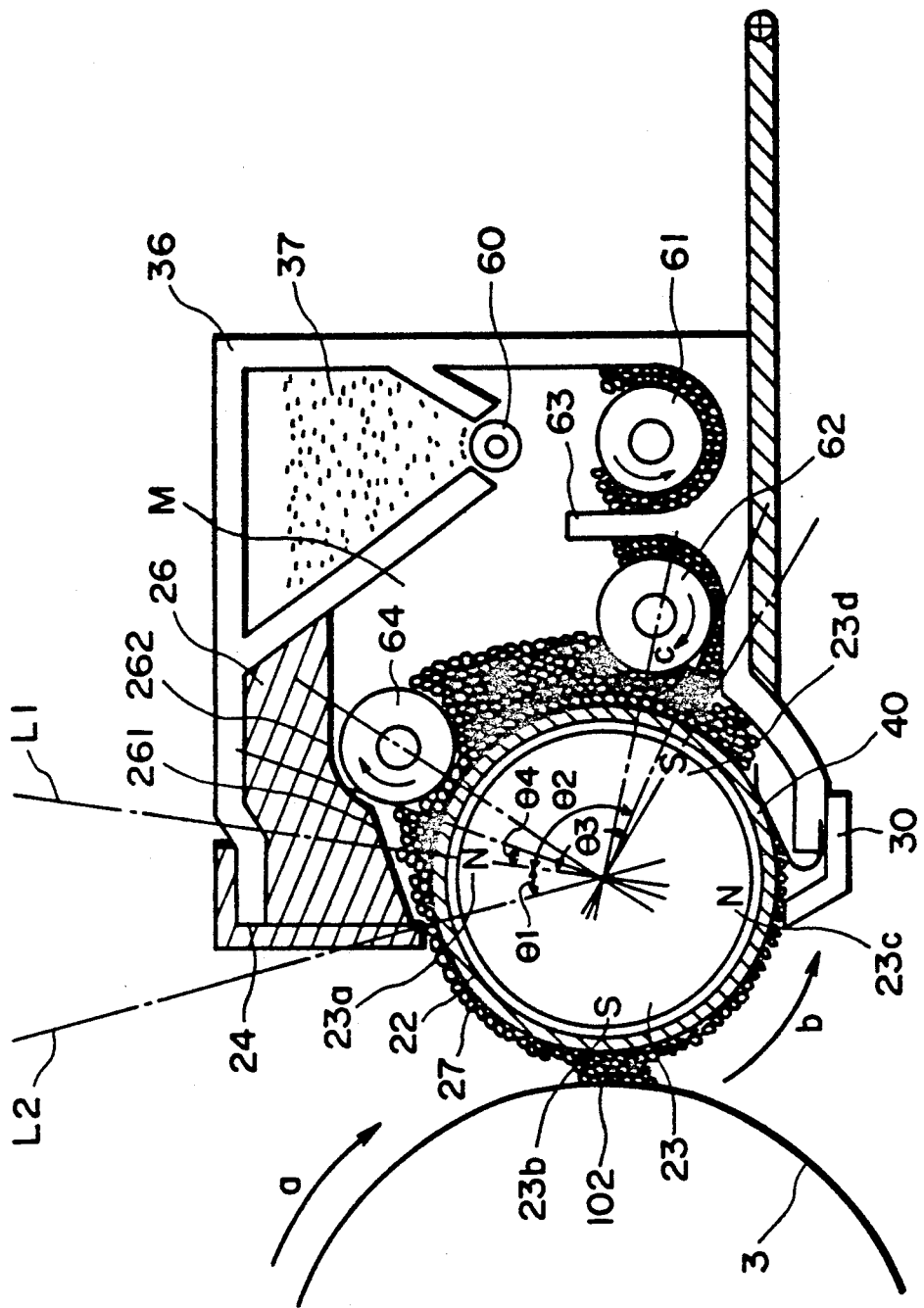
FIGS. 2 and 6 are schematic sectional views each showing a developing device used in the present invention.

FIG. 2 is an enlarged sectional view of image forming apparatus in the neighborhood of the developing device.

Referring to FIG. 2, a latent image bearing member 1 is driven in the direction indicated by an arrow a by an unshown driving device. The developing device includes a developing sleeve 22 which is disposed opposite to the image bearing member 1 and is made of non-magnetic material such as aluminum, SUS 316 (stainless steel, JIS). The developing sleeve 22 is in a longitudinal opening formed in a lower left wall of a developer container 36, and about a right half peripheral surface is in the container 36, whereas about a left half peripheral surface thereof is exposed outside. The developing sleeve 22 is rotatably supported and is driven in the direction indicated by an arrow b.

The developing device further includes a stationary magnetic field generating means 23 in the form of a stationary permanent magnet within the developing sleeve 22. The permanent magnet 23 is fixed and is maintained stationary even when the developing sleeve 22 is rotated. The magnet 23 has an N-pole 23a, S-pole 23b, N-pole 23c and an S-pole 23d, that is, it has four poles. The magnet 23 may be an electromagnetic in place of the permanent magnet. A non-magnetic blade 24 has a base portion fixed to a side wall of the container adjacent a top edge of the opening in which the developing sleeve 22 is disposed, and a free end extending at a top edge of the opening. The blade 24 serves to regulate the developer carried on the developing sleeve 22. The non-magnetic blade is made by, for example, bending to an "L" shape a stainless steel plate (SUS316).

The developing device includes a magnetic carrier particle limiting member 26 which is disposed so that the upper surface thereof contacts the lower surface of the non-magnetic blade 24. The bottom surface 261 of the limiting member 26 constitutes a developer guiding surface. The non-magnetic blade 24, the magnetic particle limiting member 26, etc., define a developer regulating station.

The reference numeral 27 designates magnetic carrier particles having a resistivity of not less than $10^7$ ohm.cm, preferably not less than $10^8$ ohm.cm, more preferably $10^9$–$10^{12}$ ohm.cm. As an example of such carrier particles, and reference numeral 37 designates non-magnetic toner.

A sealing member 40 is effective to prevent the toner stagnating adjacent to the bottom of the developer container 36 from leaking. The sealing member 40 is bent co-directionally with the rotation of the sleeve 22, and is resiliently pressed onto the surface of the sleeve 22. The sealing member 40 has its end portion at a downstream side in the region where it is contacted to the sleeve 22 so as to allow the developer to return to the container.

An electrode plate 30 for preventing scattering of the floating toner particles produced by the developing process, is supplied with a voltage having a polarity which is the same as the polarity of the toner to cause the toner particles to be deposited on the photosensitive member.

A toner supplying roller 60 is operative in response to an output of an unshown toner content detecting sensor. The sensor may be, for example, of a developer volume detecting type, a piezoelectric element type, an inductance change detecting type, an antenna type utilizing an alternating bias, or an optical density detecting type. By the rotation of the roller 60, the non-magnetic toner 37 is supplied. The supplied toner 37 is mixed and stirred while being conveyed by the screw 61 in the longitudinal direction of the sleeve 22. During the conveyance, the toner supplied is triboelectrically charged by the friction with the carrier particles. A partition 63 is cut-away at the opposite longitudinal ends of the developing device to transfer the supplied developer conveyed by a screw 61 to another screw 62.

The S-pole 23d is a conveying pole for collecting the developer remaining after the developing operation back into the container, and to convey the developer in the container to the regulating portion, by the magnetic field provided thereby.

Adjacent the magnetic pole 23d, the fresh developer conveyed by the screw 162 adjacent the sleeve 22 replaces the developer on the sleeve 22 collected after the development.

A conveying screw 64 is effective to make uniform the distribution of the developer amount along the length of the developing sleeve. The developer conveyed on the sleeve together with the rotation of the sleeve is conveyed along the length of the sleeve by the screw 64. The developer layer portion which is partly thick along the longitudinal direction of the sleeve is partly returned in the direction opposite to the sleeve movement through the space M in FIG. 2. The screw 24 conveys the developer in the direction opposite to that of the screw 62.

This structure is effective also when magnetic particles and non-magnetic or weakly magnetic toner particles are mixed in the developer container.

The distance $d_2$ between the edge of the non-magnetic blade 24 and the surface of the developing sleeve 22 is 50–900 microns, preferably 150–800 microns. If the distance is smaller than 50 microns, the magnetic carrier particles may clog the clearance to easily produce a non-uniform developer layer, and to prevent application of a sufficient amount of the developer with the result of low density and non-uniform density image. Further, the clearance $d_2$ is preferably not less than 400 microns since then it can be avoided that a non-uniform developer layer (clogging at the blade) is produced by foreign matter such as agglomerates of toner-particles and dust contained in the developer. If, on the other hand, the distance is larger than 900 microns, the amount of the developer applied on the developing sleeve 22 is increased too much, and therefore, proper regulation of the thickness of the developer layer can not be performed, and the amount of the magnetic particles deposited on the latent image bearing member is increased, and simultaneously, the circulation of the developer which will be described hereinafter and the regulation of the circulation by the developer limiting member 26 are weakened with the result of insufficient triboelectric charge leading to production of foggy background.

In FIG. 2, a line L1 is a line connecting a rotational center of the sleeve 22 and the center of the developer layer thickness regulating pole 23a, that is, the maximum magnetic flux density position on the sleeve surface; a line L2 is a line connecting the rotational center of the sleeve 22 and the free edge of the blade 24; and an angle $\theta 1$ is an angle formed between the lines L1 and L2. The angle $\theta 1$ is within the range of $-5$ to 35 degrees, preferably 0 to 25 degrees. If the angle $\theta 1$ is smaller than $-5$ degrees, the developer layer formed by the magnetic force, mirror force and/or coagulating force applied to the developer becomes non-uniform, whereas if it is larger than 35 degrees, the amount of application of the developer on the sleeve by a non-magnetic blade is increased with the result of difficulty in providing a predetermined amount of developer. A negative angle $\theta 1$ means that the line L1 is disposed downstream of the line L2 with respect to the rotational direction of the sleeve 22.

Between the magnetic pole 23d position and 23a position in the container 36, the speed of the developer layer on the sleeve 22 becomes further away from the sleeve surface due to the balance between the conveying force by the sleeve 22 and the gravity and the magnetic force against it, even though the sleeve 22 is rotated in the direction indicated by an arrow b. Some part of the developer falls due to gravity.

Therefore, by properly selecting the positions of the magnetic poles 23a and 23d, fluidability of the magnetic particles 27 and the magnetic properties thereof, the magnetic particle layer is moved more in the position closer to the sleeve 22, to constitute a moving layer. By the movement of the magnetic particles, the magnetic particles and toner particles are conveyed to a developing position together with the rotation of the sleeve 2, and is provided for the developing operation.

Figure 5:
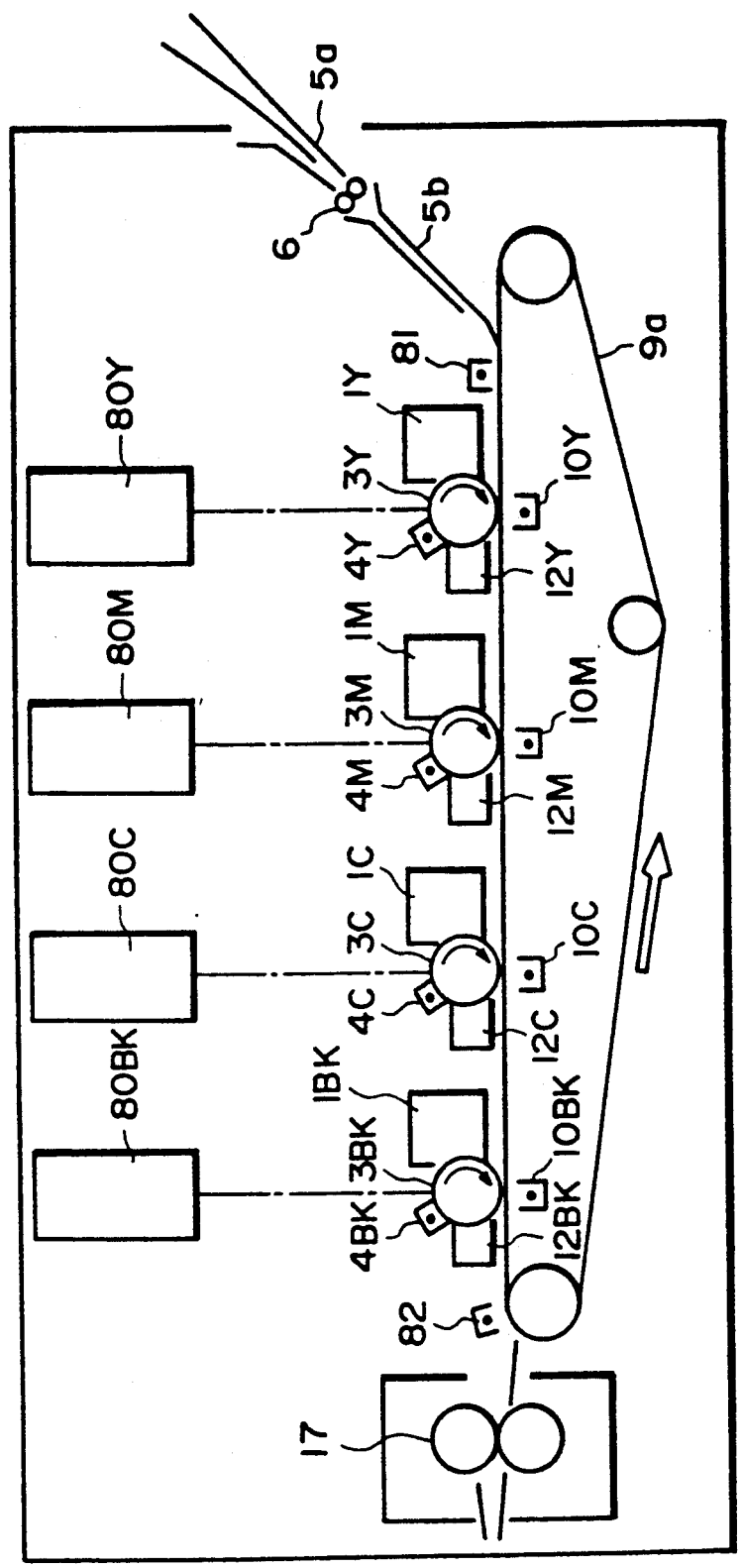

FIG. 5 shows another apparatus embodiment. The apparatus shown in FIG. 5 comprises four photosensitive members 3Y (yellow), 3M (magenta), 3C (cyan) and 3BK (black), respectively used for these four colors. Around these photosensitive members, with respect to respective colors, there are disposed laser beam scanners 80Y, 80M, 80C and 80BK; developing devices 1Y, 1M, 1C and 1BK; transfer chargers 10Y, 10M, 10C and 10BK; and cleaning devices 12Y, 12M, 12C and 12BK.

In FIG. 5, a transfer paper (not shown) is passed through a paper supply guide 5a, and conveyed by a paper supply roller 6, and a paper supply guide 5b in this order to a conveyor belt 9a. The transfer paper is subjected to corona discharge by a charger for attachment 81 and is surely attached to the conveyor belt 9a. Thereafter, toner images of four colors formed on the four photosensitive members 3Y, 3M, 3C and 3BK are transferred to the transfer paper by means of the transfer chargers 10Y, 10M, 10C and 10BK, respectively. The transfer paper having thereon the thus transferred toner image is discharged by a discharger 82 and separated from the conveyor belt 9a, and the toner image is fixed to the transfer paper by a fixing device 17 thereby to provide a full-color image.

In a case where such an apparatus gas used, there was obtained a high-definition full-color image with less scattering which comprises a low-image density portion having excellent gradational characteristic, when the above-mentioned developing device as shown in FIG. 2 and a toner having an average particle size of 8 microns or below were used under the above-mentioned developing condition.

Incidentally, while ferrite particles and a superposition of an AC bias on a DC bias were used for development in the above-mentioned instance, similar results were obtained even when ordinary iron powder and a DC bias developing method were used.

Figure 6:
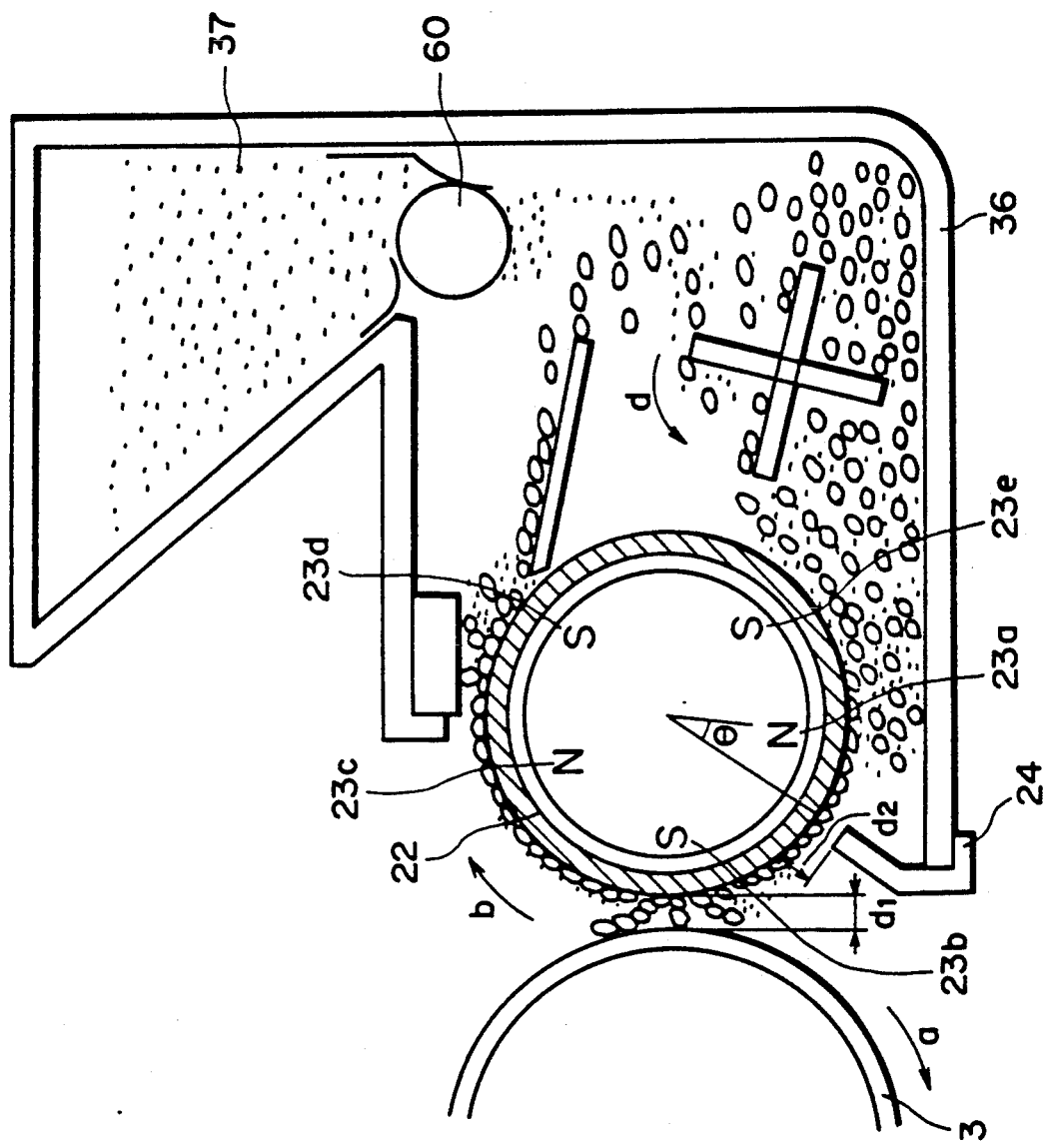

Further, in a case where a developing device as shown in FIG. 6 was used and the sleeve was rotated in a direction counter to that of the photosensitive member, a toner having an average particle size of 8 microns or below provided similar results.

More specifically, referring to FIG. 6, a toner having a particle size distribution and a particle size (e.g., a volume-average particle size of 6 microns) satisfying the condition defined by the present invention was used, the clearance $d_2$ between the end of a non-magnetic blade 24 and the surface of a photosensitive drum 3 (laminate-type organic photoconductor (OPC) drum) was set to 600 microns, and the clearance between the photosensitive drum 3 and the surface of the sleeve 22 was set to 450 microns. The drum 3 was charged to provide a latent image potential of $-600$ V. Further, in the development, there was used a bias power supply 4 providing a superposition of a rectangular alternating voltage having a frequency of 1700 Hz and a peak-to-peak value of 1500 V on a DC voltage of $-300$ V.

When a latent image was written on the photosensitive member, an original image was subjected to color separation and the resultant "magenta", "cyan", "yellow" and "black" signals were sequentially written on the photosensitive member by using a semiconductor laser beam as a light source. The spot diameter of the laser beam was 70 microns (intensity: $1/e^2$) with respect to the main scan direction and 80 microns (intensity: $1/e^2$) with respect to sub-scan direction, and the emission time was regulated by using the above-mentioned PWM control, whereby a latent image was written on the photosensitive drum at 200 lines/inch and 256 gradations.

The thus obtained latent image was developed and the resultant toner image was transferred to a transfer paper. Such a procedure was sequentially repeated with respect to respective colors, and the resultant multi-color toner image was finally fixed to obtain a full-color image. As a result, there was obtained a high-quality image with a high definition which was free of coarsening and had a low-image density portion faithfully reproduced.

On the contrary, image formation was conducted under the same conditions as described above except that a toner having a volume-average particle size of 12 microns was used. As a result, the reproducibility in a low-image density portion was inferior to that obtained in the case of a toner having a volume-average particle size of 6 microns, and there was only obtained an image wherein coarsening was noticeable as a whole.

As described hereinabove, according to an embodiment of the present invention, there is provided an image forming method using a multi-color electrophotographic apparatus wherein an original image is subjected to color separation and the resultant light beams (such as laser beam) are provided to a photosensitive drum to form thereon latent images corresponding to the respective colors, the latent images are developed with developer particles to form toner images of respective colors, which are then multiply transferred to a transfer material sequentially, thereby to provide a multi-color image. In the present invention, a toner having a volume-average particle size of 8 microns or below (particularly, one also having a sharp particle size distribution) is used as the above-mentioned developer, and the light beam is pulse-width-modulated in accordance with an image signal to obtain a half-tone image.

As a result, according to the present invention, a sufficient gradational characteristic is obtained even in a low-image density portion, and coarsening in the whole image area inclusive of the low-image density portion is remarkably reduced, whereby a high-quality full-color image is obtained.

Hereinbelow the present invention is more specifically explained with reference to specific Examples and Comparative Examples.

EXAMPLE 1

| | |
|---|---|
| Polyester resin obtained by condensation of propoxidized bisphenol and fumaric acid (weight-average molecular weight (Mw) = 15,000, number-average molecular weight m(Mn) = 3,300) | 100 wt. parts |
| Rhodamine pigment | 5 wt. parts |
| Negative charge control agent (metal complex of di-alkyl-substituted salicylic acid) | 4 wt. parts |

A mixture containing the above ingredients in the prescribed amounts was melt-kneaded. After cooling, the kneaded product was pulverized and the pulverized product was classified by means of a fixed-wall type wind-force classifier and further classified by means of a multi-division classifier utilizing a Coanda effect to obtain negatively chargeable magenta toner having a volume-average particle size of 6 microns.

The thus obtained magenta toner had a sharp particle size distribution such that it contained 95% by volume of particles having a particle size of above 3 microns and below 9 microns, and substantially 100% by volume of particles having a particle size of above 0 microns and below 12 microns.

0.4 wt. part of negatively chargeable hydrophobic colloidal silica was mixed with 100 wt. parts of the above-mentioned magenta toner to prepare a magenta toner containing externally added silica (i.e., external addition product). Then, 6 wt. parts of the magenta toner (external addition product) was mixed with 94 wt. parts of ferrite magnetic particles coated with a styrene-acrylic acid ester copolymer (weight-average particle size: 50 microns, electric resistivity: $10^{10}$ ohm/cm) to prepare a two-component developer for forming a magenta toner image.

By using cyan, yellow and black colorants shown in the following Table 1, a two-component developer for forming a cyan toner image, a two-component developer for forming a yellow toner image; and a two-component developer for forming a black toner image were respectively prepared in the same manner as described above.

TABLE 1

|  | Colorant | Volume-average particle size of toner M (μm) | % by volume of toner particles satisfying ½M < (particle size) < 3/2M | % by volume of toner particles satisfying 0 < (particle size) < 2M |
| --- | --- | --- | --- | --- |
| Cyan toner | Phthalocyanine-type pigment | 6 | 95 | 100 |
| Yellow toner | Pigment Yellow-type pigment | 6 | 95 | 100 |
| Black toner | Pigment Yellow-type pigment, Pigment Red-type pigment, and Pigment Blue-type pigment | 6 | 95 | 100 |

The above-mentioned two-component developers were respectively poured into a polyethylene container (volume: 100 ml) and vigorously shaken about 30 times by hand, and the triboelectric charge amounts were respectively measured. As a result, the toners of respective colored showed a charge amount of $-30$ μc/g.

The above-mentioned two-component developers were respectively charged in prescribed parts (developing devices) of a color-image forming apparatus shown in FIG. 1, and subjected to full-color image formation.

More specifically, referring to FIG. 1, the clearance $d_2$ between the end of a non-magnetic blade 24 and the surface of a photosensitive drum 3 (laminate-type organic photoconductor (OPC) drum) was set to 600 microns, and the clearance between the photosensitive drum 3 and the surface of a sleeve 22 was set to 450 microns. The drum 3 was charged to provide a latent image potential of $-600$ V. Further, in the development, there was used a bias power supply providing a superposition of a rectangular alternating voltage having a frequency of 1700 Hz and a peak-to-peak value of 1500 V on a DC voltage of $-300$ V.

When a latent image was written on the photosensitive member, an original image was subjected to color separation and the resultant "magenta", "cyan", "yellow" and "black" signals were sequentially written on the photosensitive member by using a semiconductor laser beam as a light source. The spot diameter of the laser beam was 70 microns (laser light intensity: $1/e^2$) with respect to the main scan direction and 80 microns (laser light intensity: $1/e^2$) with respect to sub-scan direction, and the emission time was regulated by using the above-mentioned PWM control, whereby a latent image was written on the photosensitive drum at 200 lines/inch and 256 gradations.

The thus obtained latent image was developed by a reversal developing method and the resultant toner image was electrostatically transferred to a transfer paper. Such a procedure was sequentially repeated with respect to respective colors, and the resultant multi-color toner image was finally fixed by means of a hot roller fixing device to obtain a full-color image. As a result, there was obtained a high-quality image with a high definition which was free of coarsening and had a low-image density portion (i.e., highlight portion) faithfully reproduced.

When the thus obtained full-color image was observed, dots of about 50 microns were faithfully reproduced corresponding to the latent image.

EXAMPLES 2–4

Toners having volume-average particle sizes of 5 microns, 6.8 microns and 8 microns, respectively, as shown in FIG. 4 and the following Table 2 were prepared in a similar manner as in Example 1, and were subjected to full-color image formation in the same manner as in Example 1. As a result, good results were obtained.

TABLE 2

|  | Volume-average particle size of toner M (μm) | % by volume of toner particles satisfying ½M < (particle size) <3/2M | % by volume of toner particles satisfying 0 < (particle size) <2M |
| --- | --- | --- | --- |
| Example 2 | 5 | 93 | 100 |
| Example 3 | 6.8 | 95 | 100 |
| Example 4 | 8 | 96 | 100 |

COMPARATIVE EXAMPLE 1

Toners of respective colors having a volume-average particle size of 12 microns as shown the following Table 3 were prepared in a similar manner as in Example 1. By using these toners, two-component developers of respective colors were prepared in the same manner as in Example 1 and were subjected to full-color image formation in the same manner as in Example 1.

As a result, the reproducibility in a low-image density portion was inferior to that obtained in Example 1 and there was only obtained an image wherein coarsening was noticeable as a whole.

TABLE 3

|  | Volume-average particle size of toner M (μm) | % by volume of toner particles satisfying ½M < (particle size) <3/2M | % by volume of toner particles satisfying 0 < (particle size) <2M |
| --- | --- | --- | --- |
| Magenta toner | 12 | 85 | 97 |
| Cyan toner | 12 | 85 | 97 |
| Yellow toner | 12 | 85 | 97 |
| Black toner | 12 | 85 | 97 |

The above-mentioned two-component developers were respectively poured into a polyethylene container (volume: 100 ml) and vigorously shaken about 30 times by hand, and the triboelectric charge amounts were respectively measured. As a result, the toners of respective colors showed a charge amount of −16 to −18 μc/g, which was lower than that obtained in Example 1.

When the thus obtained full-color image was observed, minimum diameter of dots which had been faithfully reproduced corresponding to the latent image, was about 90 microns.

EXAMPLES 5

Toners of respective colors having a volume-average particle sizes of 9 microns as shown in the following Table 4 were prepared in a similar manner as in Example 1. By using these toners, two-component developers were prepared in the same manner as in Example 1, and the thus obtained developers were subjected to full-color image formation in the same manner as in Example 1. As a result, there were obtained high-quality and high-definition images free of coarsening which had a low-density portion (i.e., highlight portion) faithfully reproduced, while they were somewhat inferior to those obtained in Example 1.

TABLE 4

|  | Volume-average particle size of toner M (μm) | % by volume of toner particles satisfying ½M < (particle size) <3/2M | % by volume of toner particles satisfying 0 < (particle size) <2M |
| --- | --- | --- | --- |
| Magenta toner | 9 | 96 | 100 |
| Cyan toner | 9 | 96 | 100 |
| Yellow toner | 9 | 96 | 100 |
| Black toner | 9 | 96 | 100 |

When the thus obtained full-color image was observed, dots of about 60 microns were faithfully reproduced corresponding to the latent image, as shown in FIG. 4, and dots of about 50 microns were relatively faithfully reproduced corresponding to the latent image.

We claim:

1. An image forming method, comprising:
   gradation-processing an image signal based on a halftone image to output a pulse-width-modulated signal;
   forming an electrostatic latent image on a latent image-bearing member by using a laser beam providing a spot in the form of an ellipse having a shorter axis in its main scale direction and a longer axis in its sub-scan direction on the basis of the pulse-width-modulated signal; and
   developing the electrostatic latent image with a two-component type developer comprising a toner and a carrier to reproduce the halftone image;
   wherein said toner has a volume-average particle size (M) of 9 microns or below and comprises toner particles having a particle size of r; and has a volume-basis distribution such that it comprises 90% by volume or more of toner particles satisfying $M/2 < r < 3M/2$ and comprises 99% by volume or more of tone particles satisfying $0 < r < 2M$.

2. An image forming method according to claim 1, wherein said latent image is formed by providing to the latent image-bearing member the laser beam of which emission time is controlled by said pulse-width-modulated signal.

3. An image forming method according to claim 2, wherein said latent image is developed with the developer by a reversal developing method.

4. An image forming method according to claim 1, wherein said carrier comprises magnetic particles.

5. An image forming method according to claim 4, wherein said magnetic particles have a particle size of 30–100 microns.

6. An image forming method according to claim 4, wherein said magnetic particles have a particle size of 40–80 microns.

7. An image forming method according to claim 4, wherein said magnetic particles have a resin coating layer.

8. An image forming method according to claim 7, wherein said magnetic particles comprise ferrite particles coated with a resin.

9. An image forming method according to claim 4, wherein said magnetic particles have an electric resistivity of $10^7$ ohm.cm or larger.

10. An image forming method according to claim 4, wherein said magnetic particles have an electric resistivity of $10^8$ ohm.cm. or larger.

11. An image forming method according to claim 4, wherein said magnetic particles have an electric resistivity of $10^9$ to $10^{12}$ ohm.cm.

12. An image forming method according to claim 1, wherein said latent image is formed by providing the laser beam of which emission time is controlled by said pulse-width-modulated signal to a latent image-bearing member comprising a laminate-type photoconductor, and is developed with a developer comprising a color toner and magnetic particles having an electric resistivity of $10^9$–$10^{12}$ ohm.cm. by a reversal developing method.

13. An image forming method according to claim 12, wherein the latent image is formed by subjecting an original image to color separation, and supplying the laser beam in accordance with the color-separated image to the latent image-bearing member; the latent image is developed with a developer comprising a color toner to form a color toner image; and the color toner image is transferred to a transfer material and fixed thereto to form a multi-color image.

14. An image forming method according to claim 13, wherein the latent image is developed with at least a developer comprising a magenta toner, a developer comprising a cyan toner, and a developer comprising a yellow toner, respectively.

15. An image forming method according to claim 13, wherein the latent image is further developed with a developer comprising a black toner.

16. An image forming method according to claim 12, wherein a DC bias is applied to said latent image-bearing member during the developing step.

17. An image forming method according to claim 12, wherein an AC bias is applied to said two-component developer during the developing step.

18. An image forming method according to claim 12, wherein a superposition of an AC bias on a DC bias is applied to said two-component developer during the developing step.

19. An image forming method according to claim 1, wherein said toner has a volume-average particle size of 5 to 9 microns.

20. An image forming method according to claim 1, wherein a DC bias is applied to said two-component developer during the developing step.

21. An image forming method according to claim 1, wherein an AC bias is applied to said latent image-bearing member during the developing step.

22. An image forming method according to claim 1, wherein a superposition of an AC bias on a DC bias is applied to said two-component developer during the developing step.

* * * * *

UNITED STATES PATENT AND TRADEMARK OFFICE
CERTIFICATE OF CORRECTION

PATENT NO. : 5,327,339            Page 1 of 3

DATED : July 5, 1994

INVENTOR(S) : TAKEDA ET AL.

It is certified that error appears in the above-indentified patent and that said Letters Patent is hereby corrected as shown below:

At [57] Abstract

Line 2, "including:" should read --including--.

Column 2

Line 56, "diameter:" should read --diameter;--

Column 3

Line 40, "logic" should be deleted and "denotes ECL" should read --denotes emitter coupled logic (ECL)--.

Column 4

Line 7, "No. 4)" should read --No. 3)--.
    Line 13, "signals" should read --signal--.

Column 6

Line 16, "axis" should read --axis:--.
    Line 38, "C" should be deleted.

Column 9

Line 42, "I" should read --1--.

UNITED STATES PATENT AND TRADEMARK OFFICE
CERTIFICATE OF CORRECTION

PATENT NO. : 5,327,339

DATED : July 5, 1994

INVENTOR(S) : TAKEDA ET AL.

It is certified that error appears in the above-indentified patent and that said Letters Patent is hereby corrected as shown below:

Column 10

Line 18, "I" should read --1--.

Column 13

Line 13, "gas" should read --was--.

Column 15

Line 57, "supply" should read --supply 4--.

Column 16

Line 59, "shown" should read --shown in--.

Column 17

Line 68, "scale" should read --scan--.

Column 18

Line 25, "tone" should read --toner--.

UNITED STATES PATENT AND TRADEMARK OFFICE
CERTIFICATE OF CORRECTION

PATENT NO. : 5,327,339

DATED : July 5, 1994

INVENTOR(S) : TAKEDA ET AL.

It is certified that error appears in the above-indentified patent and that said Letters Patent is hereby corrected as shown below:

<u>Column 20</u>

Line 5, "latent image-bear-" should read --two-component developer--.
    Line 6, "ing member" should be deleted--.

<u>Column 21</u>

Line 21, "latent image-bear-" should read --two-component developer--.
    Line 22, "ing member" should be deleted.

Signed and Sealed this

Twenty-seventh Day of December, 1994

*Attest:*

BRUCE LEHMAN

*Attesting Officer*    *Commissioner of Patents and Trademarks*